No. 851,580. PATENTED APR. 23, 1907.
G. W. WILLIS.
ADJUSTABLE FASTENER FOR SECURING HARROW TEETH TO THEIR SUPPORTING BARS.
APPLICATION FILED DEC. 26, 1906.
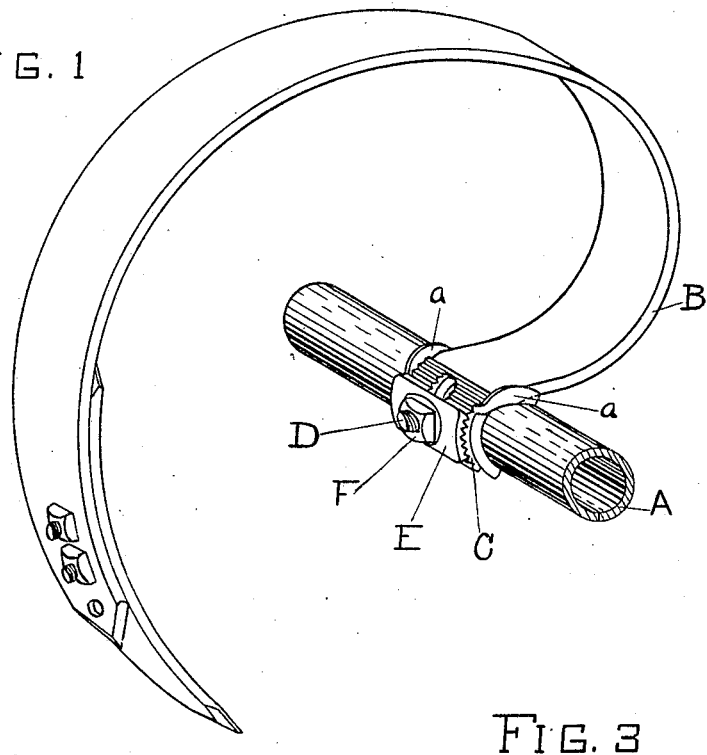
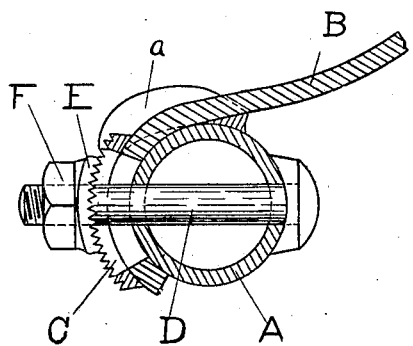
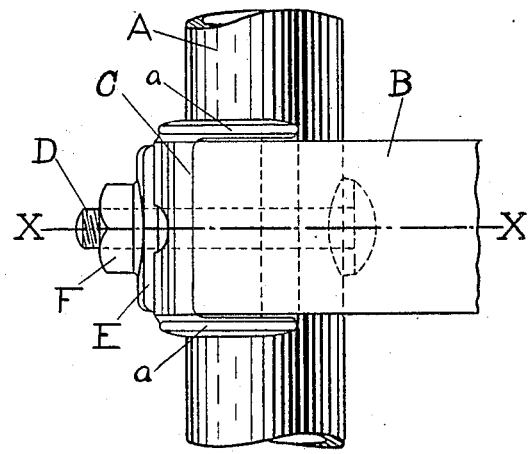
WITNESSES:
H H Masson
Arthur E. Sowell
INVENTOR
G. Walter Willis
BY E. E. Masson
ATTORNEY

UNITED STATES PATENT OFFICE.

GEORGE WALTER WILLIS, OF HOOSICK FALLS, NEW YORK.

ADJUSTABLE FASTENER FOR SECURING HARROW-TEETH TO THEIR SUPPORTING-BARS.

No. 851,580.        Specification of Letters Patent.        Patented April 23, 1907.

Application filed December 26, 1906. Serial No. 349,376.

*To all whom it may concern:*

Be it known that I, GEORGE WALTER WILLIS, a citizen of the United States, residing at Hoosick Falls, New York, have made certain new and useful Improvements in Adjustable Fasteners for Securing Harrow-Teeth to Their Supporting-Bar and other Analogous Uses, of which the following is a full, clear, and exact description, reference being had to the accompanying drawings, forming part of this specification, and in which like letters of reference indicate like parts.

Referring to said drawings, Figure 1 is a perspective, Fig. 2 is a section view on lines X X of Fig. 3, and Fig. 3 a top plan view of my invention.

The object of my invention is to provide a simple and efficient means for securing harrow teeth to a tubular frame and providing for the adjustment on the frame of the harrow teeth, which adjustment will not interfere with the tooth being held rigidly to the harrow frame.

A is the ordinary tubular harrow frame bar. B is the tooth reversely curved over the bar A. As will be noticed from Fig. 2 the tooth is eccentric to the bar A. It extends partially around the bar A and between the bar A and the tooth holder C, and thence through a slot in the tooth holder C, and is reversely curved rearwardly, as shown clearly in Fig. 1. The tooth holder C is also eccentric to the bar A, but reversely to the tooth B. The tooth holder C, as shown in Fig. 2, fits at its upper end on the bar A and is eccentric to the bar A, but reversely to the tooth B. The tooth holder is provided with shoulders *a* to prevent the sidewise movement of the tooth. The tooth holder is slotted, as is also the tooth B, and through these slots and a hole in bar A passes the bolt D which holds the tooth and tooth holder in place.

It is evident that when the stress in the operation of the harrow is applied upon the end of the tooth in contact with the soil, that the tooth and the tooth holder, being reversely eccentric to the bar A, will not cause the tooth to slip around the bar A and the force will be exerted against the nut F of bolt D. In order, however, to more securely hold the parts in place, serrated washer E may be provided which fits into the serrations of the tooth holder thus rendering any slipping of the parts impossible.

In order to adjust the harrow tooth it is only necessary to loosen the nut F sufficiently to enable the tooth holder and tooth B to be moved around the bar A to any desired point, and when the desired adjustment is made the parts are held firmly in place by screwing up nut F.

Having now described my invention, what I claim as new and desire to secure by Letters Patent is—

1. In a harrow tooth fastener, a tubular frame, a harrow tooth reversely curved over the frame, over and under a tooth holder, said tooth holder being also eccentric to the frame reversely to the tooth, and slots in the tooth and tooth holder, and means for holding the parts in place.

2. A combination of the frame A, slotted tooth B, slotted tooth holder C, and said tooth holder and tooth being eccentric to frame A and reversely to each other, and means for holding the parts in place, consisting of a bolt D and serrated washer E fitting into serrations in tooth holder C, substantially as and for the purpose described.

In witness whereof I have hereto set my hand and seal this 24th day of October, 1906.

G. WALTER WILLIS.

Attest:
     JAMES A. BECKETT,
     WALTER F. CONNOLLY.